Figure 1:
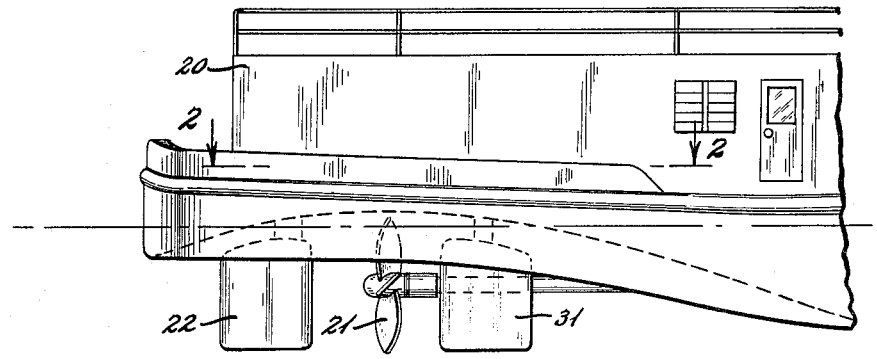

March 1, 1966 H. R. STUTEVILLE 3,237,586
STEERING CONTROL MECHANISM FOR TOWBOATS
Filed Feb. 18, 1965 6 Sheets-Sheet 1

INVENTOR
Herman R. Stuteville
BY
ATTORNEYS

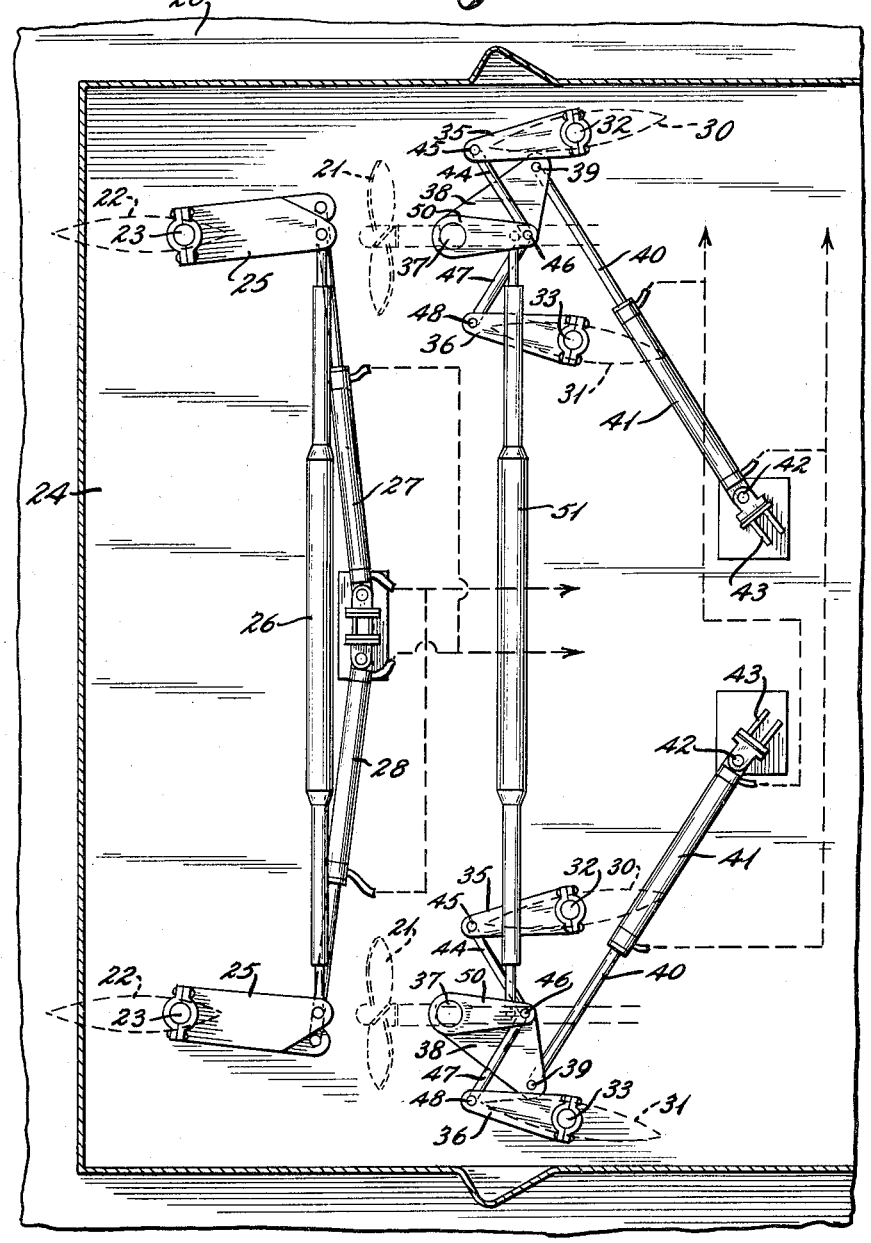

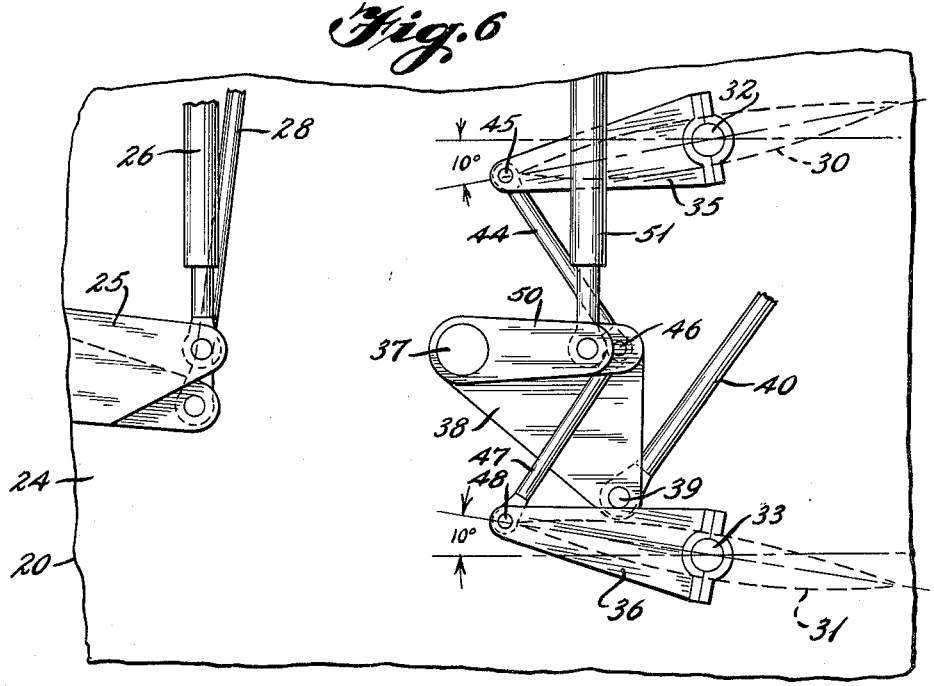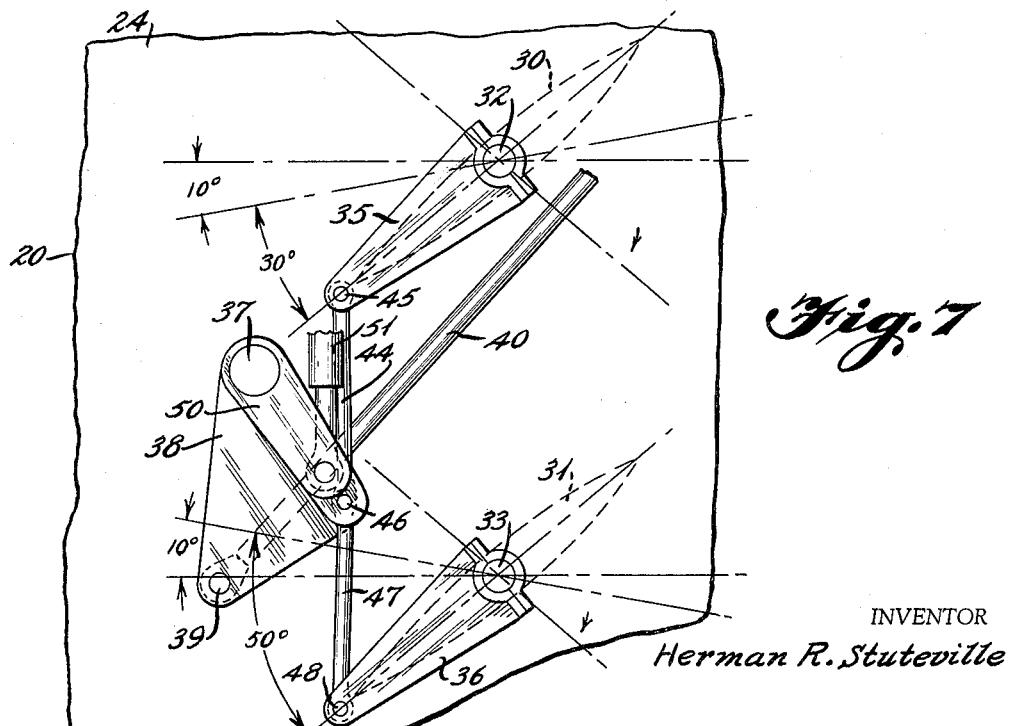

March 1, 1966  H. R. STUTEVILLE  3,237,586
STEERING CONTROL MECHANISM FOR TOWBOATS
Filed Feb. 18, 1965  6 Sheets-Sheet 5

INVENTOR
Herman R. Stuteville
BY
ATTORNEYS

March 1, 1966 H. R. STUTEVILLE 3,237,586
STEERING CONTROL MECHANISM FOR TOWBOATS
Filed Feb. 18, 1965 6 Sheets-Sheet 6
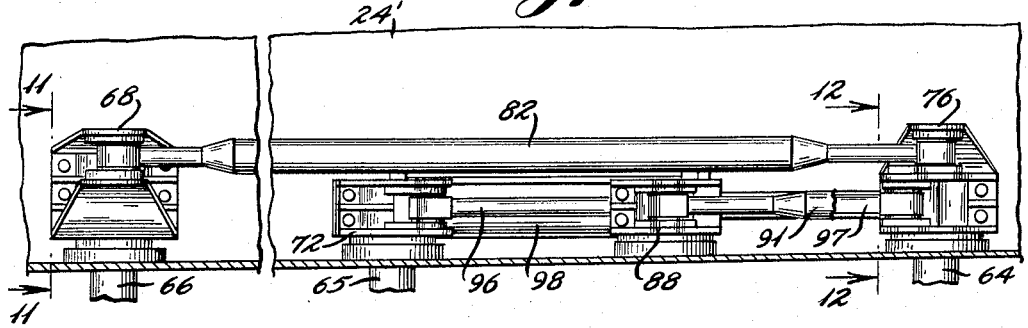
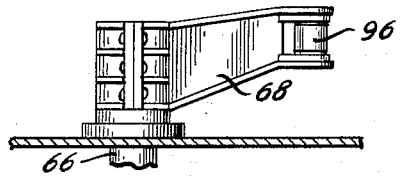
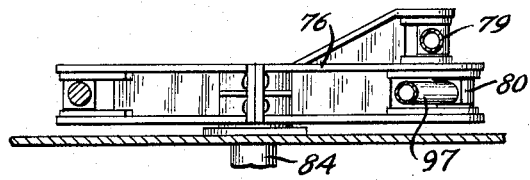
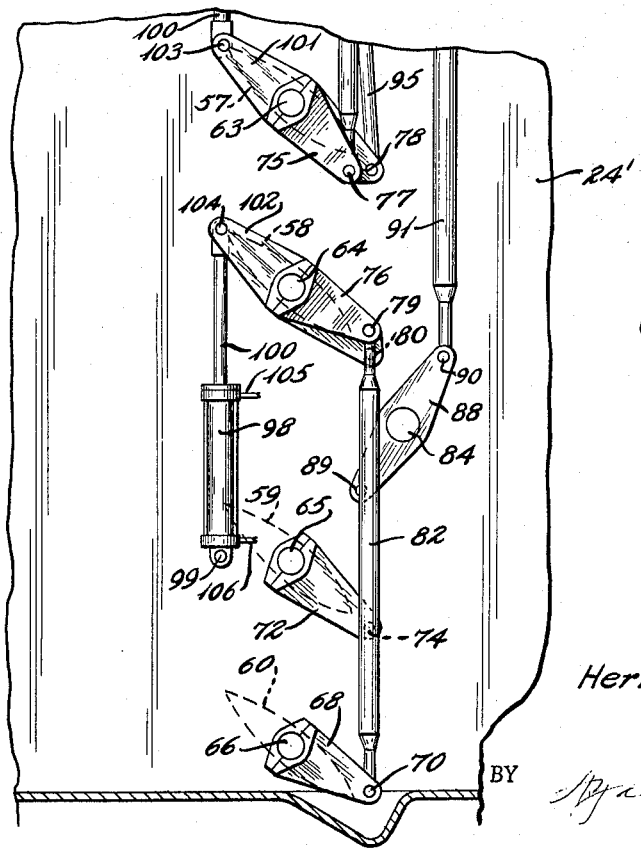
INVENTOR
Herman R. Stuteville
BY
ATTORNEYS

United States Patent Office 3,237,586
Patented Mar. 1, 1966

3,237,586
STEERING CONTROL MECHANISM
FOR TOWBOATS
Herman R. Stuteville, Nashville, Tenn., assignor to
Nashville Bridge Company, Nashville, Tenn.
Filed Feb. 18, 1965, Ser. No. 433,647
7 Claims. (Cl. 114—163)

This invention relates to the control and maneuverability of vessels or other vehicles through water, air or other mediums, as well as to apparatus and equipment by which such maneuverability is accomplished in a faster more efficient and positive manner.

The invention relates particularly to a sterring or rudder control for work boats such as towboats, tugboats or the like which require efficient steering control and maneuverability since they usually are operating in waters with many obstructions such as other boats, piers, sand bars and underwater obstructions.

Heretofore, work boats such as towboats, tugboats and the like have had a single propeller driven by a power plant and with a relatively large rudder disposed astern of the same so that the stream of water from the propeller would impinge upon the rudder to assist in controlling the direction of movement of the boat. Some of the larger work boats utilized multiple propellers and rudders to increase the speed, power and maneuverability of the boat since the motors and propellers could be used to control or assist to control the direction of the boat by stopping or reversing one of the motors while the other was moving in a forward direction. In order to further increase maneuverability, flanking rudders or a plurality of rudders forwardly of the propeller were provided which would form a channel for directing a stream of water to the propeller when the boat was going ahead and would be disposed at least partially across such stream when maneuvering.

In recent years it has been recognized that an advantage could be realized in forward propulsion if the flanking rudders were "toed in" or disposed on an angle converging toward the propellers and simultaneously it was recognized that an advantage could be realized in steerability if the flanking rudders were generally parallel when they were hard over or turned to their maximum extent. Some efforts were made along these lines using four bar linkages to accomplish this; however, these efforts have not been successful because of the fact that usually the maximum torque required to turn the flanking rudders occurs when the rudders are hard over and in this position the effective turning moment of at least one of the rudders is smallest. Also, the amount of "toe-in" was limited due to the unstable condition of the rudder with the small effective turning moment in the hard over position.

It has been discovered through much experimentation and extensive model tests that a "toe-in" angle of 5°-7½° was most effective for boats having up to 3200 horsepower and that a "toe-in" angle of up to 15° was effective for boats having higher horsepower. Experiments proved that four bar linkages could not be effectively adapted for use with the higher angle of "toe-in" since in the hard over position the rudders normally are disposed at an angle of 40° which means that if the "toe-in" angle is 15°, one rudder would move 25° and the other rudder would move 55° in order for the rudders to be substantially parallel.

It is an object of the invention to provide flanking rudders for a boat which can be "toed-in" at a relatively large angle when the rudders are in a neutral position and the boat is moving forwardly substantially in a straight line and which will be generally parallel when the rudders are disposed in an extreme position.

Another object of the invention is to provide flanking rudders for a boat having steering gear with a substantial mechanical advantage for controlling such rudders regardless of the position of such rudders relative to each other.

A further object of the invention is to provide a pair of flanking rudders for each of a plurality of propellers or other propulsion means and means for controlling all of such rudders from the same operating mechanism.

Figure 3:
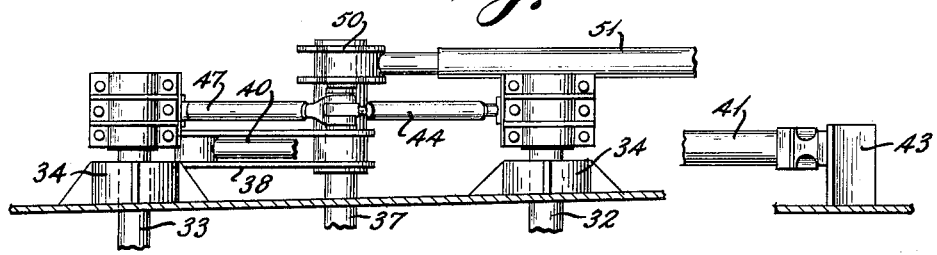
Figure 8:
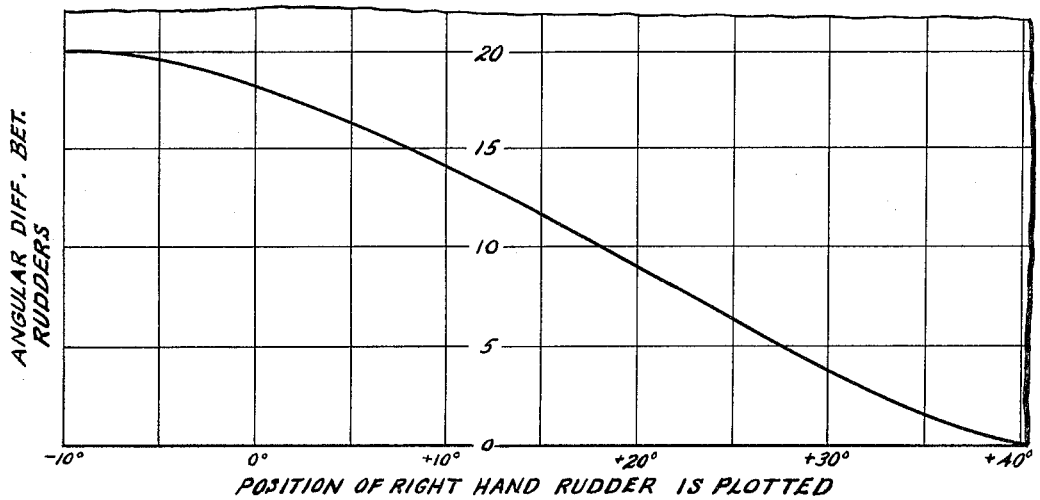
Figure 4:
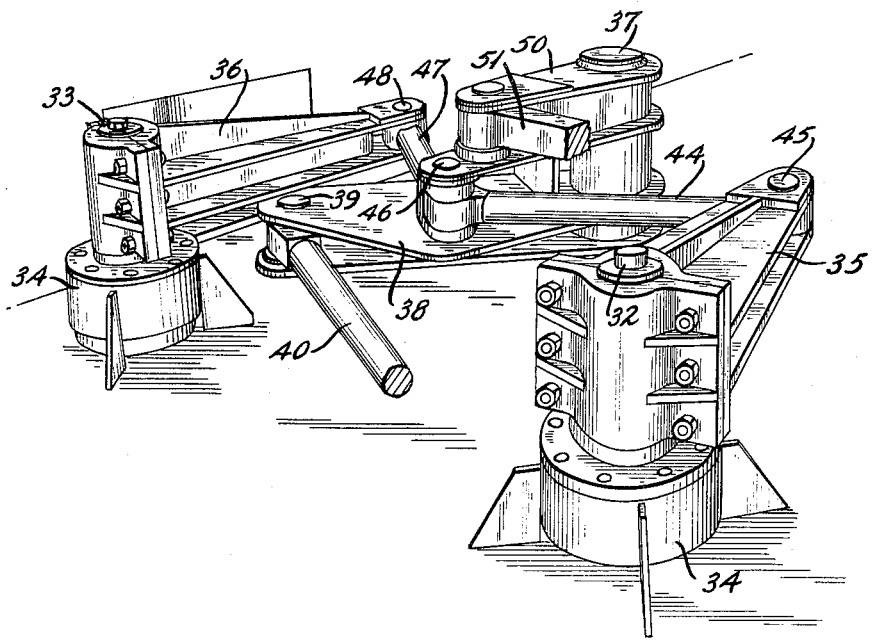
Figure 5:
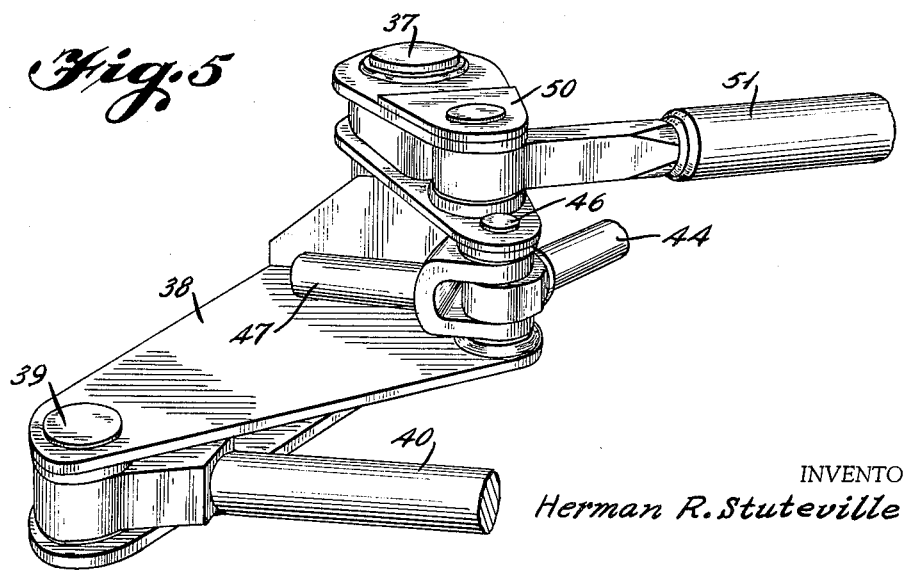
Figure 9:
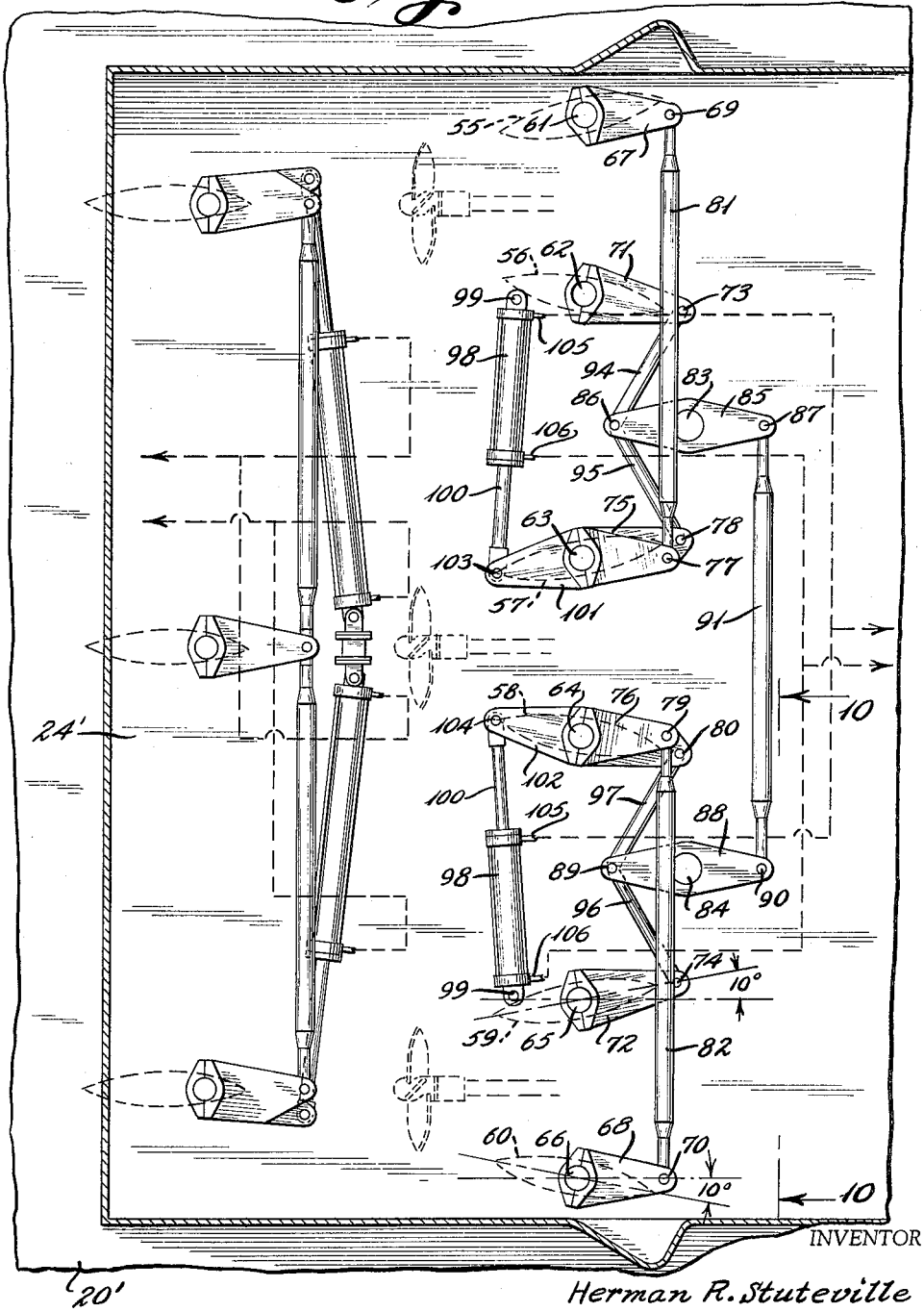

Other objects and advantages of the invention will be apparent from the following description considered in conjunction with the accompanying drawings wherein:

FIG. 1 is a side elevation of the after portion of a vessel showing a conventional propeller and rudder with flanking rudders disposed forwardly of the propeller;

FIG. 2, a top plan view of the steering room of such vessel illustrating one application of the steering control mechanism of the present invention;

FIG. 3, an enlarged side elevation thereof;

FIG. 4, an enlarged perspective of the control mechanism of one pair of flanking rudders;

FIG. 5, an enlarged perspective of the crank mechanism thereof;

FIG. 6, an enlarged top plan view of one pair of flanking rudders in neutral position;

FIG. 7, a similar top plan view of the flanking rudders in hard over or extreme position;

FIG. 8, a schematic illustrating the angular differences between the flanking rudders from the "toed-in" position to the generally parallel position;

FIG. 9, a top plan view of a modified form of the invention applied to a vessel having three propellers arranged in a neutral position;

FIG. 10, an enlarged section on the line 10—10 of FIG. 9;

FIG. 11, a section on the line 11—11 of FIG. 10;

FIG. 12, a section on the line 12—12 of FIG. 10; and

FIG. 13, a fragmentary top plan view of the structure of FIG. 9 arranged in a hard over or extreme position.

Briefly stated the present invention is a steering control mechanism for the flanking rudders of a vessel such as a towboat, tugboat or the like of relatively high horsepower rating and in which the longitudinal center lines of the flanking rudders are disposed at an angle which converges in the direction of the propeller when in neutral position and which are generally parallel to each other when in an extreme position. The flanking rudders are mounted on vertical posts each of which has a lever or tiller attached to the upper end connected by links to a crank which in turn is adapted to be rotated in any desired manner. When multiple propellers are used, the flanking rudders of each propeller are linked together so that all flanking rudders operate simultaneously.

With continued reference to the drawings, a vessel 20 of the work boat type such as a towboat, tugboat or the like is provided in which power and maneuverability are of prime importance. As illustrated in FIGS. 2–8, the vessel 20 has a pair of propellers 21 each mounted on one end of a driven propeller shaft located one on each side of the vessel and generally parallel with each other. A rudder 22 is disposed aft or rearwardly of each propeller and each of such rudders is mounted on a post 23 projecting upwardly into a steering room 24 of the vessel 20. A tiller 25 is fixed to the upper end of each post 23 and such tillers are connected together by an adjustable pivotally mounted link 26 so that they operate simultaneously. As illustrated, the rudders 22 are adapted to be rotated by a pair of interconnected fluid cylinders 27 and 28, having piston rods one connected to each of the tillers 25, although the operation of such rudders could be in any desired manner, such as electric motor, fluid motor or steam engine, and with or without reduction gearing. The above structure is all conventional in the art.

In order to provide increased maneuverability, particularly in larger boats having greater horsepower, a pair of flanking rudders 30 and 31 are disposed forwardly of each propeller 21. Such flanking rudders are mounted on stems or posts 32 and 33 respectively. In general, the flanking rudders of each propeller are substantially identical and operate in substantially the same manner so only one pair will be described.

The posts 32 and 33 project upwardly through stuffing boxes 34 into the steering room 24 where such posts are provided with rearwardly extending tillers 35 and 36 respectively. A post 37 is rotatably mounted within the vessel 20 and such post is located rearwardly of the posts 32 and 33 and substantially along the longitudinal axis of the propeller shaft. A dummy tiller or crank 38 is fixed at one end to the post 37 and the opposite end of such crank is connected by a pivot 39 to the piston rod 40 of a fluid cylinder 41 which in turn is rotatably mounted on a pivot 42 carried by a bracket 43 fixed to the deck of the steering room 24.

An advantage in forward propulsion is realized if the flanking rudders 30 and 31 are "toed-in" or arranged so that their longitudinal center lines converge toward the propeller when in a neutral or amidship position, and an advantage in maneuverability or steerability is realized if the rudders 30 and 31 are generally parallel when in a hard over or full rudder position. In order to do this, a link 44 is connected at one end by a pivot 45 to the tiller 35 and at the opposite by a pivot 46 to the crank 38 intermediate the ends thereof. A link 47 is connected at one end by a pivot 48 to the tiller 36 and the opposite end is pivotally connected to the pivot 46 carried by the crank 38. The links 44 and 47 are of a length substantially equal to the distance from the center of the posts 32 and 33 respectively to the longitudinal axis of the propeller shaft so that when the links are in alignment and substantially coextensive, the rudders 30 and 31 will be substantially parallel.

In the drawings a "toe-in" angle of 10° has been illustrated; however, this angle is regulated by the position of the pivot 46 with respect to the post 37. In other words, the "toe-in" angle can be reduced by moving the pivot toward the post 37 and can be increased by moving the pivot away from such post.

An arm 50 is fixed to the upper end of each of the posts 32 and 33 and such arms are connected by an adjustable link 51 so that both pairs of flanking rudders will be operated simultaneously.

In the operation of this modification of the device, the flanking rudders 30 and 31 at each side of the vessel are "toed-in" at a desired angle when in a neutral position to direct a stream of water to the propellers when moving forwardly. In this position the arms 50 and the portion of the crank 38 on which the pivot 46 is mounted are disposed generally along the longitudinal axis of the propeller shafts. When it is desired to turn the vessel to one side, the piston rod 40 of one of the cylinders 41 is extended while the piston rod of the other cylinder 41 is retracted to rotate the cranks 38 and the posts 37. As the cranks rotate, the links 44 and 47 will move the tillers 35 and 36 to rotate the posts 32 and 33 and the rudders 30 and 31 carried thereby. Due to the arcuate movement of the cranks, one of the tillers will move its associated rudder more rapidly than the other tiller until such time as the links 44 and 47 are substantially in alignment at which time the rudders will be generally parallel. As an example, if the vessel is to be steered to starboard or to the right, the cranks are rotated to the right as illustrated in FIG. 7. This moves the left-hand rudder through an arc of 30° to the hard over or extreme position and moves the right-hand rudder through an arc of 50° to the hard over or extreme position, such extreme position being approximately 40° from the longitudinal axis of the vessel.

With reference to FIGS. 9–13, a modified form of the invention is disclosed including a vessel 20' having three propellers 21 and a rudder 22 located rearwardly of each propeller. A pair of flanking rudders 55 and 56 are provided forwardly of the port or left-hand propeller, flanking rudders 57 and 58 are provided forwardly of the central propeller, and flanking rudders 59 and 60 are provided forwardly of the starboard or right-hand propeller. The rudders 55–60 are mounted on posts 61–66, respectively, which project upwardly into the steering room 24' of the vessel.

Forwardly extending tillers 67 and 68 having pivots 69 and 70 are fixed to the posts 61 and 66, respectively, tillers 71 and 72 having pivots 73 and 74 are fixed to posts 62 and 65, respectively, and tillers 75 and 76 are fixed to posts 63 and 64, respectively, tillers 71 and 72 being at a lower elevation than tillers 67 and 68. The tiller 75 has upper and lower pivots 77 and 78 and tiller 76 has upper and lower pivots 79 and 80. An adjustable connecting link 81 connects pivot 69 of tiller 67 with the upper pivot 77 of tiller 75 and an adjustable connecting link 82 connects pivot 70 of tiller 68 with the upper pivot 79 of tiller 76. A pair of auxiliary posts 83 and 84 are rotatably mounted within the structure of the vessel 20' with the post 83 being located substantially midway between and forwardly of posts 62 and 63 and posts 84 being located substantially midway between and forwardly of posts 64 and 65. A dummy tiller or crank 85 is mounted on the post 83 and extends forwardly and rearwardly therefrom. A pivot 86 is carried by the rear end of the crank 85 and a pivot 87 is carried by the forward end thereof. A dummy tiller or crank 88 similar to crank 85 is mounted on the post 84 and carries rear and forward pivots 89 and 90, respectively. An adjustable link 91 connected the forward pivots 87 and 90 so that the cranks 85 and 88 move simultaneously.

A link 94 connects the pivot 73 of the tiller 71 with the pivot 86 of the crank 85 and a link 95 connected the lower pivot 78 of the tiller 75 with the pivot 86 of crank 85. Similarly a link 96 connects pivot 74 of tiller 72 with pivot 89 of crank 88 and a link 97 connects the lower pivot 80 of tiller 76 with the pivot 89. The links 94, 95, 96 and 97 are each of a length subtsantially one-half the distance between the rudder posts 62 and 63 and 64 and 65, respectively.

In order to move the flanking rudders 55–60 from a "toed-in" position when in neutral to a generally parallel position when hard over, a pair of fluid cylinders 98 are provided pivotally mounted to the deck by pivots 99 and each having an extendable and retractable piston rod 100. Operating arms or levers 101 and 102 are connected to the posts 63 and 64, respectively, and have pivots 103 and 140 to which piston rods 100 are connected. The cylinders 98 are interconnected by fluid lines 105 and 106 in such a manner that when one piston rod is being extended, the other piston rod is being retracted.

In the operation of this modification, the rudders 55–60 preferably are "toed-in" at approximately a 10° angle when in a neutral or amidship position and the vessel is proceeding in a forward direction. When it is desired to steer the vessel to one side or the other, the cylinders 98 are atcivated to extend and retract the piston rods 100. Movement of the piston rods causes levers 101 and 102 to move in the same direction and rotate posts 63 and 64 and turn rudders 57 and 58. Tillers 75 and 76 carried by such posts will move links 81 and 82 to rotate posts 61 and 66 to turn rudders 55 and 60 an amount equal to the turning of the rudders 57 and 58 respectively. Movement of the tillers 75 and 76 will exert a pushing or pulling force on the links 95 and 97 depending upon the direction of movement of such tillers. The links 95 and 97 will rotate the cranks 85 and 88 and exert a force on the links 94 and 96 to move the tillers 71 and 72 which in turn control the movement of rudders 56 and 59.

Since the cranks 85 and 88 are connected together by the link 91, the posts 83 and 84 and cranks 85 and 88 become the prime controlling factors in the movement of the linkage and the rudders 55–60. From a neutral position to a hard over or extreme position one of the levers 101 and 102 must move 30° and the other lever must move 50°. When the levers begin to move and exert force on the cranks 85 and 88, such cranks must move in unison; therefore, since the cylinders are interconnected by the fluid lines 105 and 106 a greater amount of fluid will be diverted to the cylinder which must move the piston rod the greatest distance and consequently a smooth linear motion of the linkage and the rudders will be obtained. It is noted that the cylinders 98 may be attached to the linkage at any place found suitable with respect to mechanical advantage and strength requirements. The system could be operated by a single cylinder and piston rod connection to the link 91 if sufficient fluid pressure is available.

If desired, the forward connecting link 91 may be omitted and the cylinders 98 may be connected directly to the pivots 87 and 90 of the cranks 85 and 88. Also it is contemplated that the cranks 85 and 88 may be rotated in any other desired manner as by air or electric motor, internal combustion engines, steam engines, etc.

Certain types of non-propelled vessels such as barges or the like have a tendency to yaw or slew around. In order to make these vessels more stable, a pair of skegs have been provided having trim tabs along their after edges. It is further contemplated that the above linkage could be connected to such trim tabs and operated by the fluid system of the mother vessel or by a self-contained system to assist in maneuvering such vessels and thereby reduce the drag on the towing vessel.

It will be apparent that steering control mechanism has been provided having a large mechanical advantage which will move one or more pairs of rudders from a "toed-in" position when in neutral to a generally parallel position when hard over.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. A steering control mechanism comprising a pair of flanking rudders, the longitudinal axis of said rudders being disposed at an angle to each other in neutral position, means for rotating said rudders, a crank located between said rudders, means for rotating said crank, the center of rotation of said crank being longitudinally spaced from the center of rotation of said rudders, multiple link means pivotally connecting said means for rotating said rudders and said crank means, said link means being disposed at an angle to each other when the rudders are in a neutral position and being substantially coextensive when said rudders are in an extreme position.

2. A steering control mechanism for a vessel having multiple propulsion means comprising a plurality of pairs of flanking rudders, the longitudinal axes of each pair of rudders converging toward one of said propulsion means, each of said rudders mounted at one end of a rotatable post, a tiller having a pivot at one end and being attached at the opposite end to the other end of each of said posts, a pair of cranks rotatably mounted on said vessel between certain of said posts, the center of rotation of said cranks being longitudinally spaced from said certain posts, first and second pairs of link means connecting one end of each of said cranks with adjacent tillers, third link means connecting rudders of adjacent pairs, fourth link means pivotally connecting said pair of cranks, and a pair of fluid interconnected cylinders fixed to said other end of two of said posts, whereby when said cylinders are operated force will be transmitted to said cranks to rotate certain of said rudders a predetermined amount and to rotate other rudders a different amount.

3. A steering control mechanism comprising a plurality of pairs of flanking rudders, the longitudinal axis of each pair of rudders being disposed at an angle to each other in neutral position, means rotatably mounting said rudders, crank means rotatably mounted intermediate certain of said rudders, independent link means connecting said certain rudders and said crank means, said independent link means being disposed at an angle to each other when said rudders are in neutral position and being disposed substantially in alignment when said rudders are in extreme position, means connecting said plurality of rudders, and means for rotating said crank means, whereby each of said pair of rudders will be disposed on an angle to each other when in a neutral position and will be generally parallel to each other in an extreme position.

4. A steering control mechanism for a vessel having multiple propellers comprising a pair of flanking rudders located forwardly of each propeller, means pivotally mounting each of said rudders, a crank means located intermediate each pair of rudders, a pair of links pivotally mounted on said crank means, one of said links being connected to each of said rudder pivoting means, each of said links being of a length substantially one-half the distance between the rudders, and means for rotating said crank means, whereby said links and said rudders will be disposed at an angle to each other in one position and said links will be substantially coextensive and said rudders will be generally parallel in another position.

5. The structure of claim 1 in which said means for rotating said rudders includes a rotatable post mounting each rudder, and tiller means fixed to each of said posts.

6. The structure of claim 1 in which said multiple link means includes at least a pair of links and each of said links being of a length substantially equal to one-half the distance between the center of rotation of said rudders.

7. The structure of claim 1 in which said steering control mechanism includes a plurality of pairs of flanking rudders, a crank located between each pair of rudders and means connecting said cranks for simultaneous operation of said pairs of rudders.

References Cited by the Examiner

UNITED STATES PATENTS 3,009,435  11/1961  Horton _____ 114—163

FOREIGN PATENTS 277,022  11/1927  Great Britain.

MILTON BUCHLER, *Primary Examiner.*

ANDREW H. FARRELL, *Examiner.*